Jan. 9, 1923.

G. V. SEARS.
RIM TOOL.
FILED MAY 21, 1919.

1,441,377.

2 SHEETS—SHEET 1.

INVENTOR
G. V. Sears.
by Leery & Leery
Att'y.s

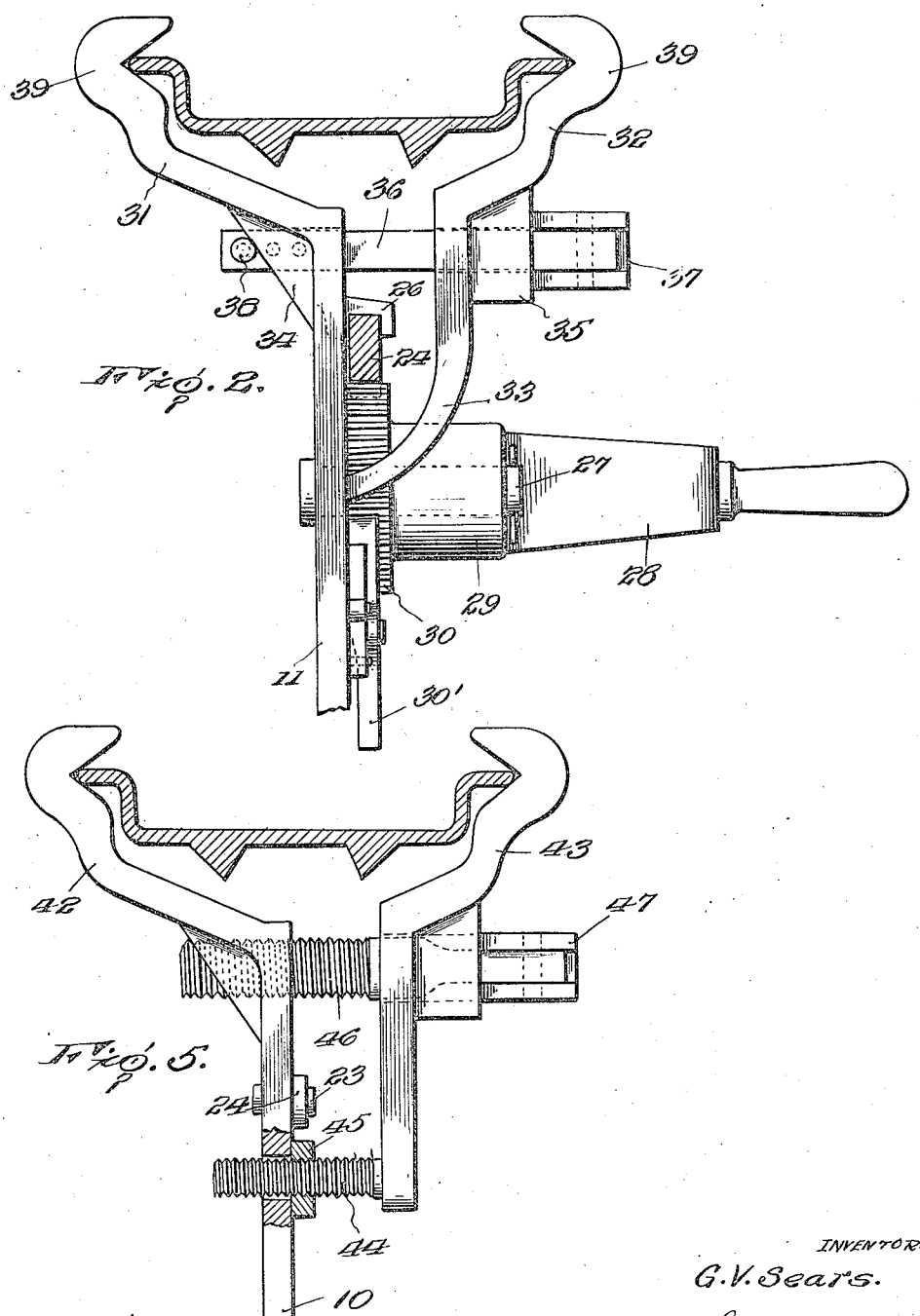

Patented Jan. 9, 1923.

1,441,377

UNITED STATES PATENT OFFICE.

GEORGE V. SEARS, OF SALT LAKE CITY, UTAH.

RIM TOOL.

Application filed May 21, 1919. Serial No. 298,609.

*To all whom it may concern:*

Be it known that I, GEORGE V. SEARS, citizen of the United States, residing at Salt Lake City, in the county of Salt Lake and State of Utah, have invented certain new and useful Improvements in a Rim Tool, of which the following is a specification.

This invention relates to an improved rim contractor and has as one of its principal objects to provide a device of this character which will render simple the operation of fitting a tire upon or removing a tire from the rim therefor.

The invention has as a further object to provide a device which may be easily applied and operated without difficulty so that the operation of placing a tire upon or removing a tire from a rim may be accomplished in the shortest possible time.

And the invention has as a still further object to provide a device which will be particularly characterized by simplicity and stability of construction.

Other and incidental objects will appear hereinafter. In the drawings:

Figure 1 is a plan view showing the manner in which my improved device is applied to a rim, the portion of the rim appearing being conventionally illustrated, Figure 2 is a sectional view taken on the line 2—2 of Figure 1, Figure 3 is a sectional view taken on the line 3—3 of Figure 1, Figure 4 is a detail perspective view of the coupling plate employed, and Figure 5 is a fragmentary elevation showing a slight modification of the invention.

In carrying the invention into effect, I employ coacting arms 10 and 11 respectively. The arm 10 is formed with a laterally curved inner end portion which terminates in a fork 12 while the inner end portion of the arm 11 is reduced somewhat and is formed with a rack 13. Fitting freely between the arms of the fork 12 is a coupling plate 14, shown in detail in Figure 4. At one side this plate is provided with a flange 15 and at its opposite side with spaced flanges 16 between which projects a lateral lug 17. The rack 13 of the arm 11 is slidably received between the flanges 15 and 16 of the plate and journaled through the arms of the fork 12 and through the lug 17 of the plate is a headed shaft 18 pivotally connecting the plate with the arm 10. Thus, as will be seen, the plate will support the arm 11 to rock with respect to the arm 10 while, at the same time, the arm 11 may shift longitudinally upon the plate. Seating upon the lug 17 of the plate between the arms of the fork 12 is a pinion 19 fixed to the shaft 18 and coacting with the rack 13 of the arm 11. At its upper end the shaft carries a handle 20 suitably connected thereto so that, as will be clear, the handle may be operated for shifting the arm 11 longitudinally with respect to the arm 10.

Formed on the arm 10 at its inner edge is an inwardly directed extension 21 arranged adjacent the free end of said arm and formed in this extension is a longitudinal slot 22. Slidably engaging in this slot is a headed pin 23 to the upper end of which is connected a longitudinally curved rack bar 24. Adjacent its free end, the arm 11 is formed at its outer edge with an outwardly directed lateral extension 25. Formed on the outer end of this extension is a keeper 26 engaging over the free end of the rack bar 24 and extending through the extension at a point opposite the keeper is a headed shaft 27. Journaled upon this shaft is a handle 28 provided at its inner end, as particularly shown in Fig. 2, with a laterally directed head 29 receiving the shaft therethrough and upon the inner end of which is formed a pinion 30 coacting with the rack bar 24. Thus, this handle may be operated for swinging the arms 10 and 11 toward or away from each other and pivoted upon the arm 11 to coact with the pinion is a spring pressed pawl 30' for locking the arms against spreading.

Depending from the outer ends of the arms 10 and 11 are fixed jaws 31 and confronting these jaws are movable jaws 32 coacting with the fixed jaws to form rim clamps at the outer ends of the arms. The jaws 32 are, as particularly shown in Figure 2, provided with laterally curved inner end portions 33 resting against the upper sides of the arms for sustaining these jaws at their inner ends with respect to the arms. Formed in the angle between the arms and the jaws 31 are spaced bracing webs 34 for the jaws and formed on the jaws 32 in the angle between the inner and outer end portions of the jaws are bosses 35. Slidable through these bosses as well as through the outer ends of the arms between the webs 34 thereof are pins 36 upon the upper ends of which are pivotally mounted cam levers 37 coacting with the bosses. At their lower ends the pins are each provided with a series of spaced openings adapted to selectively receive suitable fastening devices 38 securing the pins in position. Accordingly, as will be seen, the effective length of the pins may be readily varied, while the movable jaws will also thus be adjustably connected with the arms. At their outer ends the jaws 31 and 32 are formed with substantially V-shaped rim engaging portions 39 extending at substantially right angles to the axes of the arms 10 and 11.

In operating the device the jaws of the rim clamps at the outer ends of the arms 10 and 11 are engaged around the edge portions of a rim at opposite sides of the split therein so that, as suggested in Figure 1, the device will lie within the plane thereof. For convenience, I have shown one end portion of a rim at 40 and the other end portion of the rim at 41. The handle 28 is then moved to spread the arms slightly so that the rim ends will be shifted out of engagement with each other. This done, the handle 20 is then operated for drawing the arm 11 radially inward with respect to the arm 10 and consequently shifting the rim end 40 inwardly out of register with the rim end 41. The handle 27 is then again swung but in a direction opposite to the first movement thereof for drawing the free ends of the arms toward each other and moving the rim ends into overlapping relation so that the rim will thus be contracted. Coincidentally the pawl 30' will lock the arms against spreading for thus holding the rim in its contracted position. Consequently, a tire may be readily removed from the rim and, by reversing the operation just described, a tire may, as easily, be placed upon the rim. In this connection, it is to be observed that when the handle 20 is operated for drawing the arm 11 radially inward, the pin 23 will ride within the slot 22 so as to prevent binding between the rack bar 24 and guide 26. Furthermore, attention is also particularly directed, in this connection, to the fact that when the rim is contracted the rim will be flexed throughout its entire circumference and the strain will accordingly be distributed throughout the circumference of the rim. Furthermore, the rim will be flexed without any side or lateral strain such as would tend to distort the rim.

As will now be appreciated, it will be particularly necessary that the rim clamps firmly engage the rim ends so that when the arms 10 and 11 are swung with respect to each other, the clamps will not slip along the rim. Accordingly, I have provided the jaws of the clamps with the substantially V-shaped rim engaging portions 39. As shown in Figure 2, these rim engaging portions are adapted to embrace the side portions of the rim and, being straight, will, when the cam levers 37 are operated to clamp the jaws in engagement with the rim, bind against the curved surfaces of said side portions so that, as will be seen, slipping of the clamps will be prevented. Furthermore, as will also be seen, this binding action between the jaws of the clamps and the side portions of the rim will be materially increased when the arms 10 and 11 are brought under stress flexing the rim.

In Figure 5 of the drawings I have shown a slight modification of the invention which, however, relates more particularly to the construction of the rim engaging clamps. Referring now more particularly to this figure, it will be observed that I have shown the modified clamp in connection with the arm 10 of the device. At its outer end the arm is formed with a fixed jaw 42 identical with the fixed jaw 31 of the preferred construction. Mounted to coact with the fixed jaw is a movable jaw 43 identical with the movable jaws 32 of preferred construction, with the exception that the movable jaw 43 is, in lieu of a laterally curved inner end portion, provided with a laterally directed post 44 which is loosely received through the arm 10 and upon which is threaded a nut 45 coacting with the arm. Thus, as will be seen, this nut may be adjusted for adjusting the inner end portion of the movable jaw with respect to the arm. Loosely fitted through the movable jaw and threaded through the outer end of the arm is a pin 46 corresponding to the pins 39 of the preferred construction and pivotally mounted upon the upper end of said pin is a cam lever 47 identical with the cam levers 37. As will be seen, the pin 46 may be rotated for varying the effective length thereof so that this modified form of clamp, consequently, provides a construction which may be adjusted to fit rims materially varying in width.

Having thus described the invention, what is claimed as new is:

1. In a rim tool, coacting pivotally connected arms, rim engaging means carried by the free end portions of the arms, a rack bar slidably connected with one of the arms and extending transversely between the arms, rack bar operating means mounted upon the other of said arms and coacting with said rack bar for swinging the arms relative to each other in the plane of the arms, and shifting means for moving one of the arms radially with respect to the other.

2. In a rim tool, coacting arms, one provided with a fork. a coupling plate received within the fork and slidably supporting the other of the arms normally extending through the fork, a shaft pivotally connecting said plate with the fork, a rack formed on the latter arm, a pinion coacting with said rack for shifting the latter arm radially with respect to the first arm, means for swinging the arms relative to each other in the plane of said arms, and rim engaging means carried by the outer end portions of the arms.

In testimony whereof I affix my signature.

GEORGE V. SEARS. [L. S.]